United States Patent
Pandharikar et al.

(10) Patent No.: US 7,587,635 B2
(45) Date of Patent: Sep. 8, 2009

(54) METHOD OF DEBUGGING "ACTIVE" UNIT USING "NON-INTRUSIVE SOURCE-LEVEL DEBUGGER" ON "STANDBY" UNIT OF HIGH AVAILABILITY SYSTEM

(75) Inventors: Anand M. Pandharikar, Milpitas, CA (US); Pankaj Malhotra, Sunnyvale, CA (US); Prashant S. Chauhan, Sunnyvale, CA (US); Shyam Sundar Vaidyanathan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 10/959,352

(22) Filed: Oct. 4, 2004

(65) Prior Publication Data

US 2006/0075295 A1    Apr. 6, 2006

(51) Int. Cl.
    *G06F 11/00* (2006.01)
(52) U.S. Cl. .......................................... 714/27; 717/124
(58) Field of Classification Search .................... 714/27
    See application file for complete search history.

(56) References Cited

U.S. PATENT DOCUMENTS

| | | | | |
|---|---|---|---|---|
| 4,713,793 A * | 12/1987 | Conforti | ...................... | 710/107 |
| 5,140,593 A * | 8/1992 | Hayashi | ........................ | 714/31 |
| 5,410,685 A * | 4/1995 | Banda et al. | .................. | 714/38 |
| 5,488,688 A * | 1/1996 | Gonzales et al. | ............... | 714/34 |
| 5,619,644 A * | 4/1997 | Crockett et al. | ............... | 714/45 |
| 5,630,049 A * | 5/1997 | Cardoza et al. | ............... | 714/25 |
| 5,903,718 A * | 5/1999 | Marik | ........................ | 714/38 |
| 6,035,422 A * | 3/2000 | Hohl et al. | .................... | 714/35 |
| 6,094,530 A * | 7/2000 | Brandewie | .................. | 717/127 |
| 6,170,070 B1 * | 1/2001 | Ju et al. | ....................... | 714/718 |
| 6,269,454 B1 * | 7/2001 | Mann et al. | ................... | 714/25 |
| 6,370,660 B1 * | 4/2002 | Mann | .......................... | 714/38 |
| 6,543,048 B1 * | 4/2003 | Kuzemchak et al. | ......... | 717/127 |
| 6,584,590 B1 * | 6/2003 | Bean | .......................... | 714/724 |
| 6,694,447 B1 * | 2/2004 | Leach et al. | .................... | 714/6 |
| 6,754,730 B2 * | 6/2004 | Kuan et al. | .................... | 710/15 |
| 6,766,472 B2 * | 7/2004 | Hogdal et al. | ................. | 714/25 |
| 6,775,698 B1 * | 8/2004 | Simone | ....................... | 709/221 |
| 6,826,717 B1 * | 11/2004 | Draper et al. | ................. | 714/39 |
| 7,039,014 B1 * | 5/2006 | Krishnamurthy et al. | .... | 370/244 |
| 7,042,876 B1 * | 5/2006 | Jayasenan et al. | ........... | 370/389 |
| 7,114,100 B2 * | 9/2006 | Hogdal et al. | ................. | 714/27 |
| 7,117,306 B2 * | 10/2006 | Rudelic | ....................... | 711/118 |
| 7,254,746 B1 * | 8/2007 | Kaushik et al. | ............... | 714/27 |

(Continued)

*Primary Examiner*—Scott T. Baderman
*Assistant Examiner*—Loan Truong
(74) *Attorney, Agent, or Firm*—Cesari and McKenna LLP

(57) ABSTRACT

A method of debugging an active unit in a computer system having an active unit for routing computer connections and a standby unit configured to route computer connections in the event the active unit fails. The method comprises the standby unit receiving synchronization data from the active unit in the form of update messages; storing the received synchronization data in local storage; receiving a request for data to be used to perform debugging on the active unit; searching local storage for the requested data; if the requested data is found on the local storage then returning that data to the source of the request; if the requested data is not found on the local storage then requesting the requested data from the active unit, receiving the requested data from the active unit, and returning the received requested data to the source of the request.

21 Claims, 3 Drawing Sheets

U.S. PATENT DOCUMENTS

| | | |
|---|---|---|
| 7,376,864 B1 * | 5/2008 | Hu et al. .......................... 714/8 |
| 2003/0120977 A1 * | 6/2003 | Tang ............................ 714/38 |
| 2004/0199812 A1 * | 10/2004 | Earl et al. ..................... 714/13 |
| 2004/0215857 A1 * | 10/2004 | Takeuchi et al. ............ 710/113 |
| 2004/0243883 A1 * | 12/2004 | Shankar et al. ................ 714/38 |
| 2004/0267836 A1 * | 12/2004 | Armangau et al. ........... 707/203 |
| 2005/0071824 A1 * | 3/2005 | K. N. et al. ................... 717/138 |
| 2005/0097398 A1 * | 5/2005 | Day et al. ..................... 714/38 |

* cited by examiner

METHOD OF DEBUGGING "ACTIVE" UNIT USING "NON-INTRUSIVE SOURCE-LEVEL DEBUGGER" ON "STANDBY" UNIT OF HIGH AVAILABILITY SYSTEM

FIELD

The present invention relates broadly to computer networks and backup systems configured to replace active systems in the event of failure of active systems. Specifically, the present invention is related to utilizing a standby unit to debug an active unit in a high-availability system.

BACKGROUND OF THE INVENTION

Troubleshooting a real-time system running in a production environment has always been a challenge due to varied configurations and traffic properties that are difficult to replicate in development labs as well as due to limited debugging tools available for use in production environments.

Prior approaches to debug and resolve issues in a production environment involve running debug images in a production environment. However, this approach is not desirable because of the time it takes to set up and run a debug image. This approach cannot be performed in real time. Another approach is to replicate a similar setup in a development lab, where engineers attempt to replicate the problem and use enhanced debug tools. Again, this approach suffers the drawback of delay, and often the problem is difficult to replicate. Yet another approach has been the exchange of logs, traces and memory dumps among customer support engineers and development engineers, which is perhaps the most time-consuming way to solve problems experienced in production environments.

A source-level debugger is often used while troubleshooting in development labs. Many real-time operating systems include a debug agent that, in conjunction with a debugger running on a host machine, facilitates source-level debugging. An example of such a system is VxWorks that runs the Wind DeBug (WDB) Agent to talk to a GNU debugger (GDB) application running on a Sun workstation. However, this approach is service impacting and is difficult to use in a production environment as it is intrusive and requires the CPU of the machine being debugged to be halted. Also, source-level debuggers such as VxWorks need the host machine to be connected to the system to be debugged, which may pose difficulty for remotely debugging an active system.

High-Availability real-time systems are characterized by minimal downtime achieved by built-in redundancy in the system architecture. The above limitations of traditional debugging methods become more significant in high-availability environment because of the intrusive nature of these methods.

SUMMARY OF THE INVENTION

The present invention provides a mechanism to more effectively troubleshoot a high-availability production system by running a customized, non-intrusive source-level debugger on a hot standby unit. In one aspect, the present invention provides a method of debugging an active unit, by receiving synchronization data from the active unit in the form of update messages; storing the received synchronization data in local storage; receiving a request for data, the requested data to be used to perform debugging on the active unit; searching local storage for the requested data; if the requested data is found on the local storage then returning that data to the source of the request; if the requested data is not found on the local storage then requesting the requested data from the active unit, receiving the requested data from the active unit, and returning the received requested data to the source of the request.

Other features and advantages of the present invention will be realized from reading the following detailed description, when considered in conjunction with the accompanying drawings, in which:

BRIEF DESCRIPTION OF THE INVENTION

DETAILED DESCRIPTION

Figure 1:
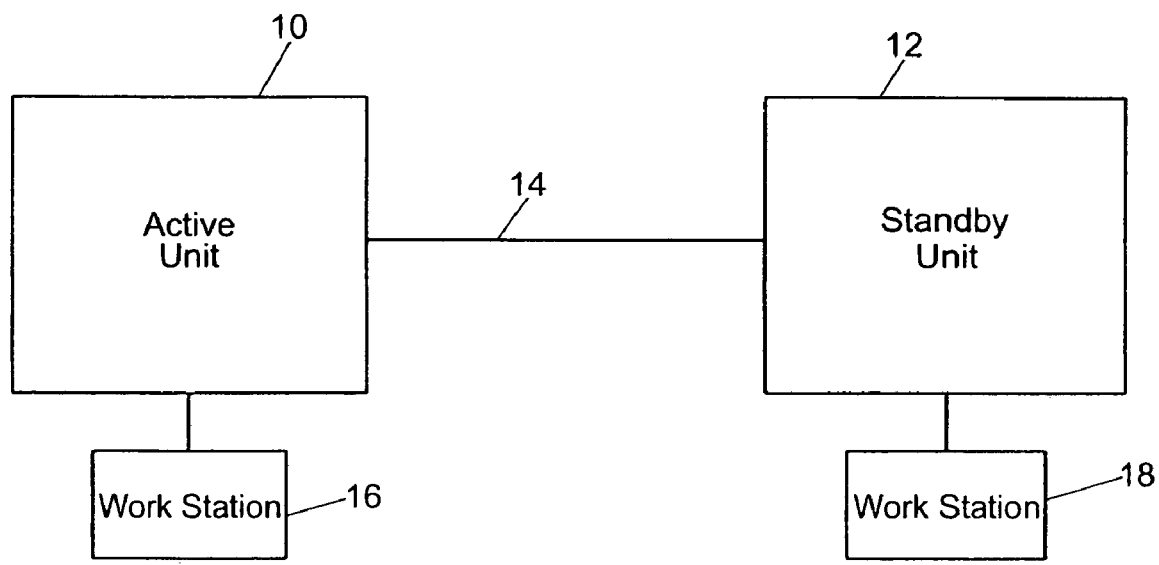
FIG. 1 illustrates in block diagram an active computer system and a standby computer system linked together.

Directing attention to FIG. 1, in accordance with the present invention, active unit 10 is a computer system connected to another computer system, standby unit 12, via link 14. Active unit 10 as well as standby unit 12, in various embodiments, can be either a single computer or a network of computers. Active unit 10 and standby unit 12 form a high-availability computer system, such as maintained by an Internet service provider (ISP), that is configured to service a plurality of connections to remote computers. In this system, standby unit 12 is configured in a similar manner as active unit 10, such that standby unit 12 can replace active computer system 10 without service interruption to remote clients in the event that active computer system 10 fails or crashes, or exhibits characteristics leading to failure or crashes. In an embodiment, once functionality is swapped between active unit 10 and standby unit 12, (formerly) active unit 10 becomes the standby unit for (now active) standby unit 12, and standby unit 12 serves remote clients and sends update messages to (formerly) active unit 10. During normal operation, in an embodiment, standby unit 12 periodically receives synchronization information from active unit 10 so that standby unit 12 is able to transition to serve as the active computer system with an acceptably small delay.

Both active unit 10 and standby unit 12 maintain various databases and registers that are synchronized through update messages sent from active unit to standby unit 12. Workstation 16 is connected to active unit 10 as workstation 18 is connected to standby unit 12. Periodic synchronization is not CPU-intensive, so standby unit 12 has available resources that can be used to perform debugging of problems experienced in active unit 10. Because of the separation between standby unit 12 and active unit 10, in various embodiments of the present invention, a customized and integrated debugger program can be executed on standby unit 12 to debug active unit 10, with minimal intrusiveness and CPU consumption. In some embodiments, certain modules of the debugger program can be executed directly on active unit 10, but such modules do not perform any intrusive function on active unit 10. Common examples of debugging functions performed by standby unit 12 in accordance with the present invention include checking the characteristics of active unit 10 by examining data structures, variables, state machines or register values on active unit 10 that are pushed during periodic synchronization to standby unit 12. This enables standby unit 12 to monitor the current state of subsystems and state machines, events and event characteristics specific to a subsystem, register values such as counters and statistical information and error conditions. All of the above data may not be available through an existing user interface to the system. In some cases, standby unit 12 can perform debugging by monitoring cached information received from active unit 10.

Figure 2:
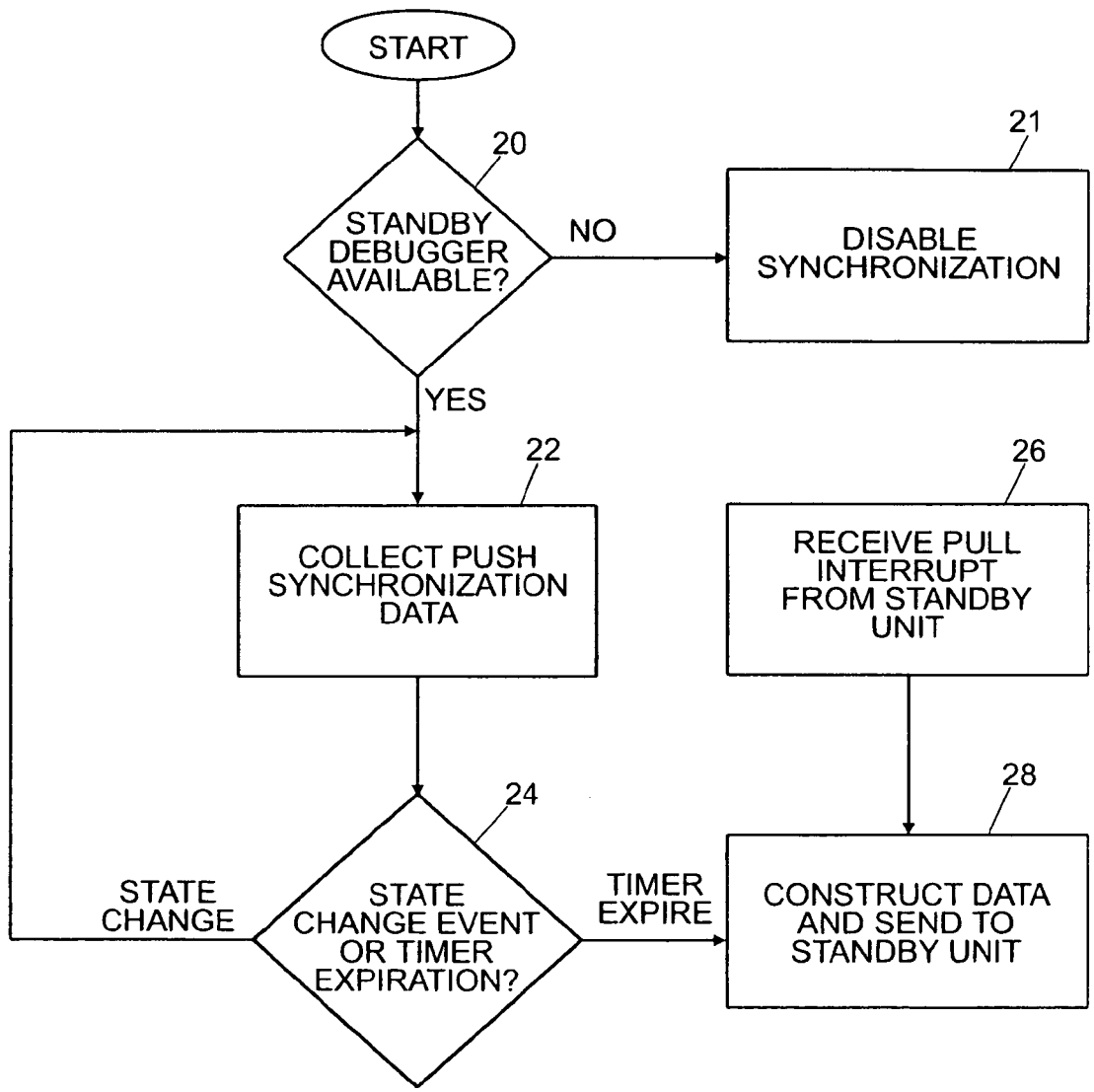
FIG. 2 illustrates in flow diagram form a sequence of acts performed by the active computer system illustrated in FIG. 1.

Directing attention to FIG. 2, a general sequence of acts performed in accordance with the push model of the present invention is illustrated. Beginning at optional decision act 20, if a debugger is not available on standby unit 12, non-intrusive debugger modules located on active unit 10 can be disabled (act 21). Otherwise, at act 22, data is prepared and stored in an update packet. The update packet contains values relating to the monitored items described above. At act 24, active unit 10 checks for state change or timer expiration. In the case of a state change, control returns to act 22, where synchronization data is updated. If there is a timer expiration, control transitions to act 28, where synchronization data collected and stored in act 22 is assembled into an update message and sent to standby unit 12. In this manner, information is continually updated on state changes in active system 10 until a periodic timer expires. This leads to collected information to be sent via link 14 to standby unit 12. If a "pull" interrupt is received (act 26) requesting specific debugged information, this information is assembled from the stored packets at act 28 or other data maintained by active unit 10, such as IOS queues, and transmitted to standby unit 12.

Figure 3:
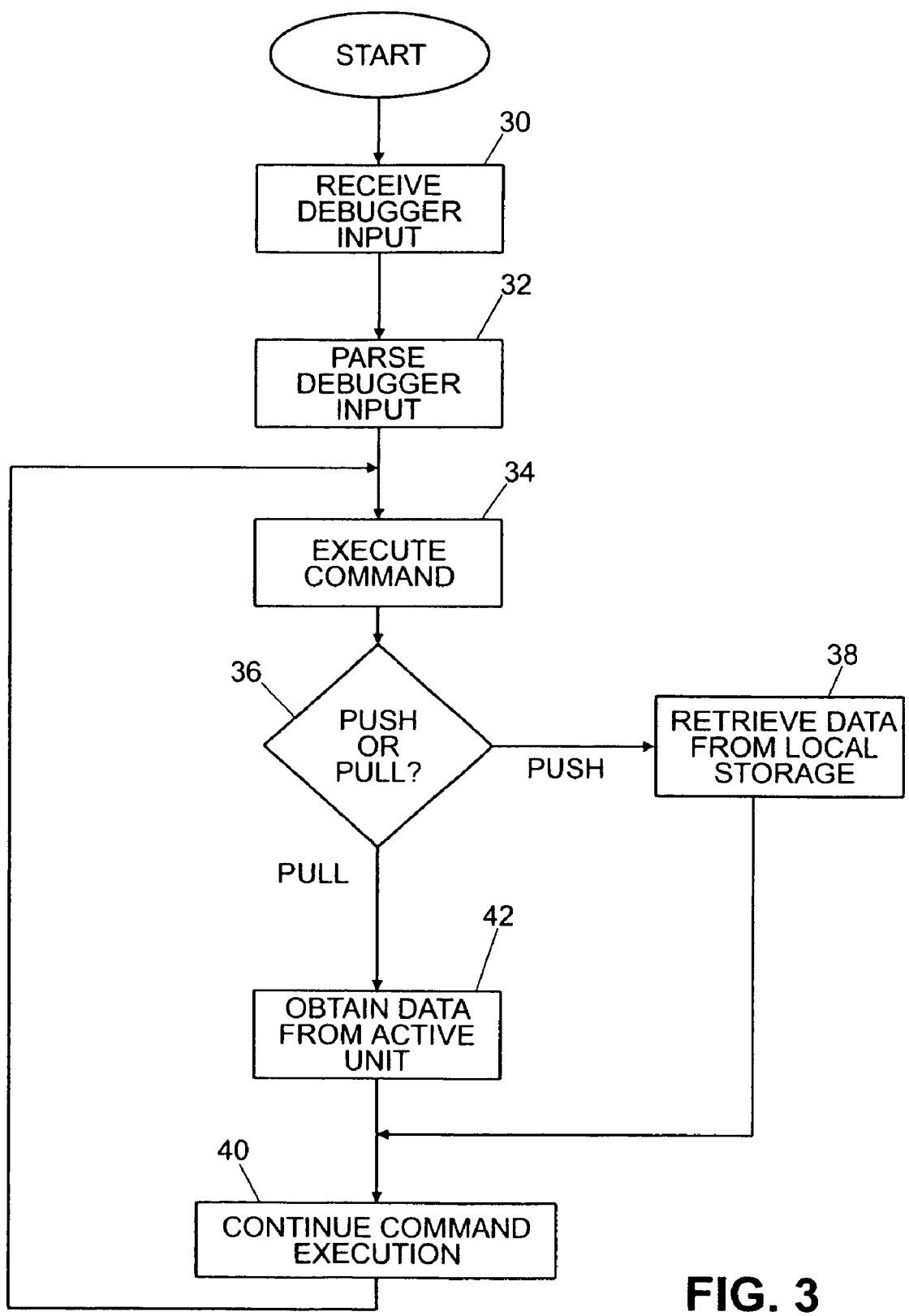
FIG. 3 illustrates in flow diagram form a sequence of acts performed by the standby computer system illustrated in FIG. 1.

Directing attention to FIG. 3, a general sequence of acts performed by standby unit 12 is illustrated. At step 30, standby unit receives some debugger input. In various embodiments of the present invention, debugger input can be embodied in commands received from a network administrator working from workstation 22 or a debugger program executing on workstation 22, or commands generated by a debugger program run in background processing mode on standby unit 12. At act 32, standby unit 12 parses the received debugger input. Parsing the debugger input can include determining a command or set of commands to be executed on standby unit 12, as well as making other determinations, such as various states present in active system 10, reading values of data structures, and the like. Control proceeds to act 34, where commands received in the debugger input are executed. At decision act 36, a determination is made as to whether the command executed at act 32 requires a push or pull of data. If a push is required, data required for command execution is obtained from synchronization data received from active unit 10 and maintained in local storage (act 38) and commands are executed further at act 40. If a determination is made at decision act 36 that a pull is required, control transitions to act 42, where data is obtained from active unit 10 in the form of the data package transmitted at act 28 in FIG. 2. Control then transitions to act 40, where further execution of the command(s) is performed. Control transitions back to act 34, where additional commands are executed.

Active unit 10 and standby unit 12, in various embodiments, include combinations of processors, termination cards, and universal port DSP cards, among other components known to those skilled in the art and typically found in gateway routing systems. For example, active unit 10 and standby unit 12 may include a STM-1 termination card that provides an STM-1 interface for high-density PSTN connectivity. In an embodiment, this card provides a maximum of 1890 (1953 in SS7/IMT configuration) DS0 channels (63 E1s) via a single STM-1 connection. The SDH/STM-1 trunk card is a high-density multiplex/demultiplex card that takes in an STM-1 (Synchronous Digital Hierarchy [SDH]) pipe, used to transport up to 1890 (1953 in SS7/IMT configuration) DS0 channels. Digital calls are terminated onboard the SDH/STM-1 trunk card on HDLC controllers. There are 512 HDLC controllers and each HDLC controller can be used for either a D-channel or one digital call. The SDH/STM-1 trunk card can terminate a maximum of 512 digital calls, less the number of D-channels. For example, with 63 D-channels allocated, 449 digital calls can be terminated. Additional digital calls and analog modem-originated calls are passed over the TDM bus to an available modem resource pool. The physical layer interface for the SDH/STM-1 trunk card is synchronous transport module (STM). Each SDH/STM-1 trunk card has two 155-Mbps STM physical layer interfaces which allow 1+1 fiber protection. Each SDH/STM-1 trunk card has two LC small form-factor type fiber receptacles to allow connection to single-mode optical fiber. The SDH/STM-1 trunk card supports SDH MIB RFC 1595, DS1 MIB RFC 1406, and provides support for SNMPv1 agent (RFC 1155-1157), and Management Information Base (MIB) II (RFC 1213). The SDH/STM-1 trunk card supports online insertion and removal (OIR), a feature that allows users to remove and replace trunk cards in active unit 10 and standby unit 12 while the system is operating, without disrupting other cards and their associated calls. In an embodiment, a test port is provided to test drop-and-insert testing on any DS1/E1 from an external testing device including monitoring of both transmit and receive directions on any E1s with a built-in DS1/E1 interface.

Active unit 10 and standby unit 12 may also include a route switch controller. In various embodiments, the route switch controller includes integrated IP switching and routing functions, high-performance programmable Layers 3 and 4 IP packet switch with 5-Gbps application-specific integrated circuit (ASIC)-based switch fabric, fully distributed Cisco Express Forwarding for optimal packet forwarding, multiple processors, capability for building integrated timing supply (BITS) clock input, and dual redundant Gigabit Ethernet egress fiber links.

A CT3 interface card may also be included for high-density PSTN connectivity. This card provides a maximum of 672 channels via a single CT3 connection. The CT3 card provides standards-based M13 multiplexer capability in conjunction with local High-Level Data Link Control (HDLC) or distributed DSP resources to fully terminate up to 28 T1s. The CT3 card also includes a channel service unit (CSU) for terminating a CT3 trunk directly from a telecommunications network. This card also terminates 216 user connections.

Configuration of any T1 interface contained within the CT3 interface can be provisioned independently of other CT1 interfaces included within the same CT3 facility. Therefore, users can configure the CT3 card to carry ISDN PRI trunks (each connected to a different switch type), and a variety of North American robbed-bit signaling (RBS) types such as Loop Start and Ground Start all on the same active or standby unit. Configuring the CT3 interface and the accompanying PRI/T1 trunks can be performed using a command-line interface (CLI). A CT3/216 Termination Card can also be provided in active unit 10 and standby unit 12 to provide physical termination for up to 24 E1 R2s, PRIs, or intermachine trunks (IMTs). An active unit or standby unit using four 24-port interface cards can fully terminate up to 86 E1 trunks or 96 T1 trunks. The E1/T1 interface ports on these trunk cards can be configured independently of any other interface. Non-intrusive monitoring of individual E1/T1 PRI signals is available at the front of the E1/T1 termination card via standard 100-ohm bantam jacks.

A 324-port DSP card can also be included in active unit 10 and standby unit 12. These DSP ports are fully consistent with the any-to-any, fully pooled model for DSP resources in active unit 10 or standby unit 12.

While a system and method for performing non-intrusive debugging of an active unit by a standby unit have been described and illustrated in detail, it is to be understood that many modifications can be made to various embodiments of the present invention without departing from the spirit thereof.

What is claimed is:

1. In a computer system having an active unit for routing computer connections and a standby unit configured to route computer connections in the event the active unit fails, a method of debugging an active unit, the method comprising:
   the standby unit receiving synchronization data from the active unit in the form of update messages;
   the standby unit storing the received synchronization data in local storage;
   the standby unit receiving a request for data, the requested data to be used to perform debugging on the active unit;
   searching local storage for the requested data;
   if the requested data is found on the local storage then returning that data to a source of the request;
   if the requested data is not found on the local storage then requesting the requested data from the active unit, receiving the requested data at the standby unit from the active unit, and returning the received requested data to the source of the request.

2. The method of claim 1, wherein the request for data is made by a computer connected to the standby unit that communicates with the standby unit.

3. The method of claim 1, wherein the requested data comprises values for an IOS queue.

4. A computer readable medium containing instructions which, when executed by a computer system comprising an active unit for routing computer connections and a standby unit configured to route computer connections in the event the active unit fails, perform debugging of an active unit on a standby unit by directing the standby unit to perform:
   receiving synchronization data from the active unit in the form of update messages;
   storing the received synchronization data in a local storage;
   receiving a request for data, the requested data to be used to perform debugging on the active unit;
   searching the local storage for the requested data;
   if the requested data is found on the local storage, then returning the found data to a source of the request;
   if the requested data is not found on the local storage, then requesting the requested data from the active unit, receiving the requested data from the active unit at the standby unit, and returning the received requested data to the source of the request.

5. A network device that routes computer connections across a computer network, the network device comprising:
   a means for receiving synchronization data from an active network routing device in a form of update messages;
   a local storage means for storing the received synchronization data;
   a means for receiving a request for data, the requested data to be used to perform debugging on the active network routing device;
   a means for searching the local storage for the requested data;
   a means for determining if the requested data is found on the local storage means and returning the data if found to a source of the request;
   a means for determining if the requested data is not found on the local storage means and requesting the requested data from the active network routing device, receiving the requested data at the network device from the active network routing device, and returning the received requested data to the source of the request.

6. The method of claim 1, further comprising:
   executing a source-level debugger on the standby unit, the source level debugger receiving the request for data, searching the local storage, and returning the found data or received requested data.

7. The method of claim 5, wherein the source-level debugger is executed in a background processing mode.

8. The method of claim 2, further comprising:
   executing a debugger program on the computer connected to the standby unit, the debugger program to supply the request for data.

9. The method of claim 2, further wherein returning the found data or received requested data is to a debugger program executing on the computer connected to the standby unit.

10. The method of claim 1, further comprising:
    checking a data structure, variable, or register value in the synchronization data for the requested data.

11. A system comprising:
    an active unit configured to service at least one remote computer;
    a standby unit coupled to the active unit and configured to receive synchronization data from the active unit, store the synchronization data in local storage, and use the synchronization data to service the at least one remote computer in the event of a failure of the active unit; and
    a debugger configured to execute on the standby unit, the debugger to collect data used to debug the active unit, the debugger to search the synchronization data in the local storage of the standby unit for the data to debug the active unit, and
    if the data to debug the active unit is found in the synchronization data in the local storage of the standby unit, then return that data, and
    if the data to debug the active unit is not found in the synchronization data in the local storage of the standby unit, then cause the standby unit to request that data from the active unit, and return that data when received.

12. The system of claim 11, wherein the debugger configured to execute on the standby unit is a source-level debugger.

13. The system of claim 12, wherein the source-level debugger is configured to execute in a background processing mode.

14. The system of claim 11, further comprising:
    a workstation coupled to the standby unit; and
    a debugger program configured to execute on the workstation, the debugger program configured to generate debugger input and to supply the debugger input to the debugger on the standby unit.

15. The system of claim 14 wherein the debugger input comprise a command to be executed by the standby unit, the command to control collection of data used to debug the active unit.

16. The system of claim 11 further comprising:
    a workstation coupled to the standby unit; and
    wherein the debugger is configured to return the data to be used to perform debugging on the active unit to the workstation.

17. The system of claim 11, wherein the debugger configured to execute on the standby unit checks one of a data structure, variable, or register value in the synchronization data.

18. The system of claim 11, wherein the active unit is configured to periodically produce and send update packets including the synchronization data to the standby unit.

19. The system of claim 11, wherein the active unit is configured to produce and send update packets including the synchronization data to the standby unit in response to a state change on the active unit.

20. The method of claim 1, wherein the active unit is a first routing system including a processor and one or more interface cards, and the standby unit is a second routing system including a processor and one or more interface cards, and the standby unit is configured to replace the active unit and route computer connections in the event the active unit fails.

21. The system of claim 11, wherein the active unit is a first routing system including a processor and one or more interface cards, and the standby unit is a second routing system including a processor and one or more interface cards, and the standby unit is configured to replace the active unit in the event of a failure of the active unit.

* * * * *